No. 773,395. Patented October 25, 1904.

UNITED STATES PATENT OFFICE.

THOMAS JONES, OF ACME, TEXAS.

METHOD OF PURIFYING WATER.

SPECIFICATION forming part of Letters Patent No. 773,395, dated October 25, 1904.

Application filed May 18, 1904. Serial No. 208,610. (No model.)

*To all whom it may concern:*

Be it known that I, THOMAS JONES, a citizen of the United States, and a resident of Acme, in the county of Hardeman and State of Texas, have invented a new and Improved Method of Purifying Water, of which the following is a full, clear, and exact description.

My invention relates to purification of water, especially for domestic uses, my more particular object being to remove gypsum and certain carbonates, together with organic substances, should any be present.

My invention admits of general use, but is of peculiar value in certain sections of the country where housekeepers have been annoyed to a great extent by the presence of impurities in water.

In certain parts of Texas, and, indeed, throughout a considerable region of the Southwest, there occur long dry spells, no rain falling for months at a time. During such a drought as this the only water to be had in many localities is saturated with gypsum. This water is too "hard" to be used for washing and is almost useless for any other domestic purposes. In addition to being saturated with gypsum said water contains large quantities of earthy salts and also organic matter held not only in solution but in suspension.

My invention is a method for relieving said water of the presence of sulfates and of the acid carbonates of lime, magnesia, and iron and also for removing any organic substances which may be present, especially should they be in solution.

By the use of my method I remove the gypsum and carbonates from the water and afterward recover so much of the chemicals employed as may have any value. Suppose now that the water to be purified is saturated with gypsum and that it holds in solution carbonates of lime, magnesia, and iron. I run the water into a tank or other receptacle of any desired shape or size, either large or small. The tank may be of any suitable material—such, for instance, as iron or cement.

To every eight hundred pounds of the water to be purified I add a small quantity of freshly-burned pure lime, the same having been previously slaked with hot water and reduced to the consistency of milk. The quantity of lime thus used may vary. If the water contains no organic substances in solution, one-half of a pound of the lime will suffice. If, however, the water contains organic substances, I find that three-quarters of a pound, or even more, of the lime may be desirable. The lime-water having the consistency of milk is poured directly into the tank and is made to diffuse as rapidly as possible through the water to be purified. The entire volume of the water is agitated for several minutes and then allowed to stand for a little time, whereupon precipitation promptly takes place. The soluble acid carbonates are readily reduced to a condition of insolubility, and a part of the lime combines with the free carbonic acid found in the water. It will be noted that all of the carbonates thus formed are insoluble—that is, the action of the lime upon the soluble acid carbonates makes an insoluble precipitate, and the chemical union of the carbonic acid (carbon dioxid) with the lime forms carbonate of lime, which is also insoluble. If now the water contains much organic matter, and a larger portion of lime is used, as above described, say three-quarters of a pound, the operation is a little slower, but is otherwise substantially the same, with the addition of the precipitation of an insoluble precipitate, due to the combination of the lime and the organic substances.

The precise proportion of lime necessary to neutralize the carbonic acid and to reduce the acid carbonates may be readily found by testing the water with litmus-paper or by performing experiments with different proportions of lime solution until satisfactory results are obtained. The precipitation being complete, the residual water, consisting of a saturated solution of gypsum, is transferred by means of a siphon into another tank, being then ready for further treatment. To every eight hundred pounds of water thus prepared I add twenty-six ounces of orthosilicate of soda or of any corresponding salt of potash, the former being preferable, however.

In either case the alkaline silicate is boiled with water and brought to the consistency of thin syrup. This syrup is then added to the water in the tank and properly stirred, so as to render the admixing as rapid as possible. I find that the best results are obtained when the alkali is diffused almost instantly throughout the entire body of water in the tank. When the ingredients are thus thoroughly admixed, double decomposition immediately ensues. The alkali of the silica instantly combines with the sulfuric acid of the gypsum, breaking up the latter and setting free the lime, which promptly recombines with the silica in a nascent state and forms therewith an insoluble silicate of lime, which is immediately precipitated. The water in the tank contains a minute quantity of sulfate of soda. This salt is soluble in two or three parts of water. The whole of the salt may be recovered by being allowed to accumulate for a time and then be removed. If the water be used for a boiler, for instance, the sodium sulfate may be blown out after it reaches a predetermined density and may be allowed to stand in an evaporating-tank until it crystallizes. The operation is now complete. The water in the tank is transferred, preferably by means of a siphon, to a reservoir, from which it may be used as desired.

The precipitate made from the silica may be applied to various uses or may be further treated for the purpose of eliminating the lime and producing pure gelatinous silica, and this substance may be employed as a filler for wood in combination with varnish.

Having thus described my invention, I claim as new and desire to secure by Letters Patent—

1. The method herein described of purifying water to remove gypsum and carbonates held in solution therein, which consists in treating the said water with lime and an alkaline silicate, as set forth.

2. The method herein described of purifying water, consisting in adding lime-water to the water to be purified, and then adding to the residual water an alkaline silicate, as set forth.

3. The method herein described of purifying water, consisting in adding lime-water of the consistency of milk to the water to be purified, and then adding to the residual water an alkaline-silicate solution of the consistency of syrup, as set forth.

4. The method herein described of purifying water, consisting in adding lime-water to the water to be purified, and then adding to the residual water orthosilicate of soda, as set forth.

5. The method herein described of purifying water, consisting in adding lime-water of the consistency of milk to the water to be purified, and then adding to the residual water a solution of orthosilicate of soda of the consistency of syrup, as set forth.

In testimony whereof I have signed my name to this specification in the presence of two subscribing witnesses.

THOMAS JONES.

Witnesses:
J. B. ROBERTSON,
JAS. E. WILEY.